(12) United States Patent
Lee et al.

(10) Patent No.: US 7,269,304 B2
(45) Date of Patent: Sep. 11, 2007

(54) TRANSCODER SYSTEM FOR ADAPTIVELY REDUCING FRAME-RATE

(75) Inventors: Wei-Jen Lee, Taipei (TW); Wen-Jen Ho, Taipei (TW)

(73) Assignee: Institute For Information Industry, Taipei (TW)

( * ) Notice: Subject to any disclaimer, the term of this patent is extended or adjusted under 35 U.S.C. 154(b) by 739 days.

(21) Appl. No.: 10/809,381

(22) Filed: Mar. 26, 2004

(65) Prior Publication Data

US 2005/0105619 A1    May 19, 2005

(30) Foreign Application Priority Data

Nov. 19, 2003  (TW) ............................. 92132433 A

(51) Int. Cl.
*G06K 9/36* (2006.01)
(52) U.S. Cl. .................................................... 382/382
(58) Field of Classification Search ........ 382/232–233, 382/236, 238–240, 244–252; 348/390.1, 348/410.1, 421.1; 375/240.02, 240.03, 240.04, 375/240.05, 240.08, 240.09, 240.12, 240.16, 375/240.26, 240.28
See application file for complete search history.

(56) References Cited

U.S. PATENT DOCUMENTS

| | | | | |
|---|---|---|---|---|
| 6,466,623 B1 * | 10/2002 | Youn et al. | ............ | 375/240.16 |
| 6,490,320 B1 * | 12/2002 | Vetro et al. | ............ | 375/240.08 |
| 6,490,627 B1 * | 12/2002 | Kalra et al. | ................. | 709/231 |
| 6,647,061 B1 * | 11/2003 | Panusopone et al. | .. | 375/240.12 |
| 6,934,329 B1 * | 8/2005 | Pau et al. | .............. | 375/240.02 |
| 6,959,041 B2 * | 10/2005 | Ishiyama | ............... | 375/240.02 |
| 7,126,993 B2 * | 10/2006 | Kitamura et al. | ...... | 375/240.26 |

* cited by examiner

*Primary Examiner*—Jose L. Couso
(74) *Attorney, Agent, or Firm*—Bacon & Thomas, PLLC

(57) ABSTRACT

A transcoder system for adaptively reducing frame rate is provided, which can change audio-visual stream of a GOP (group of picture). Each picture in the GOP consists of a plurality of macroblocks. The transcoder system includes a switching device, a variable length decoder, a motion vector compensation device, a memory and an encoder/decoder. The motion vector compensation device can compute output motion vectors respectively for the macroblocks in accordance with input picture types, so video data of I-, P- and B-pictures without complete reduced frame-rate transcoding in the prior art can be avoided. Therefore, video transcoding for pictures can be performed completely and quickly to thus reduce required transcoding computation and further increase transcoding speed.

7 Claims, 10 Drawing Sheets

|  | Type of incomming non-skipped frame | Type of preceding non-skipped frame |
| --- | --- | --- |
| Type 1 | P | I or P |
| Type 2 | B | I or P |
| Type 3 | B | B |
| Type 4 | P | B |

TRANSCODER SYSTEM FOR ADAPTIVELY REDUCING FRAME-RATE

BACKGROUND OF THE INVENTION

1. Field of the Invention

The present invention relates to the technical field of video transcoding and, more particularly, to a transcoder system for adaptively reducing frame rate.

2. Description of Related Art

For typically transmitting an audio-visual stream, due to the limitation of network bandwidth, the stream needs video transcoding to convert it into an audio-visual stream with reduced frame-rate for transmission in a congested network. Namely, in video transcoding, frame-rate for moving picture compression data is reduced to form another moving picture compression data that reduces frame-rate and further bit-rate for meeting insufficient video transmission requirement.

FIG. 1 is a block diagram of a typical video transcoder. As shown, a decoder 110 decodes a moving picture compression data and eliminates unwanted pictures. Next, an encoder 120 re-compresses and re-codes the remaining pictures in order to obtain reduced frame-rate. However, such a processing consumes much time because a motion vector estimation step is a must for coding.

To overcome this, a solution proposed that motion vectors for macroblocks originally inputted are applied repeatedly to video transcoding. FIG. 2 is a block diagram of a typical video transcoder applied for the aforementioned solution. As shown in FIG. 2, a variable length decoder is applied to compute the motion vectors of the macroblocks and next store the motion vectors in a memory used by a motion vector compensator in coding. However, only I- and P-pictures are transcoded for reduced frame-rate in the prior art, which skips B-pictures and thus cannot perform video transcoding completely and quickly for reduced frame-rate.

Therefore, it is desirable to provide an improved transcoder system to mitigate and/or obviate the aforementioned problems.

SUMMARY OF THE INVENTION

The object of the present invention is to provide a transcoder system for adaptively reducing frame rate, which can avoid the aforementioned problems and perform video transcoding for pictures completely and quickly, thereby reducing required transcoding computation and increasing transcoding speed.

In accordance with one aspect of the present invention, there is provided a transcoder system for adaptively reducing frame rate, The transcoder system can change audio-visual stream of a GOP (group of pictures), each picture consisting of a plurality of macroblocks. The transcoder system includes a switching device, a variable length decoder (VLD), a motion vector compensation device, a memory and an encoder/decoder (codec). The switching device inputs the audio-visual stream and permits passing a part of pictures in accordance with a first algorithm. The variable length decoder connected to the switching device retrieves motion vector for each macroblock in the pictures. The motion vector compensation device computes output motion vectors respectively for the macroblocks in accordance with an input picture type. The memory connected to the motion vector compensation device stores the output motion vectors computed by the motion vector compensation device. The codec connected to the switching device decodes the pictures passing through the switching device using motion vector technique and then re-codes the pictures decoded in accordance with the output motion vectors computed by the motion vector compensation device.

Other objects, advantages, and novel features of the invention will become more apparent from the following detailed description when taken in conjunction with the accompanying drawings.

BRIEF DESCRIPTION OF THE DRAWINGS

FIG. 5 is a schematic table of types of input pictures to be coded in accordance with the invention;

DETAILED DESCRIPTION OF THE PREFERRED EMBODIMENT

Figure 1:
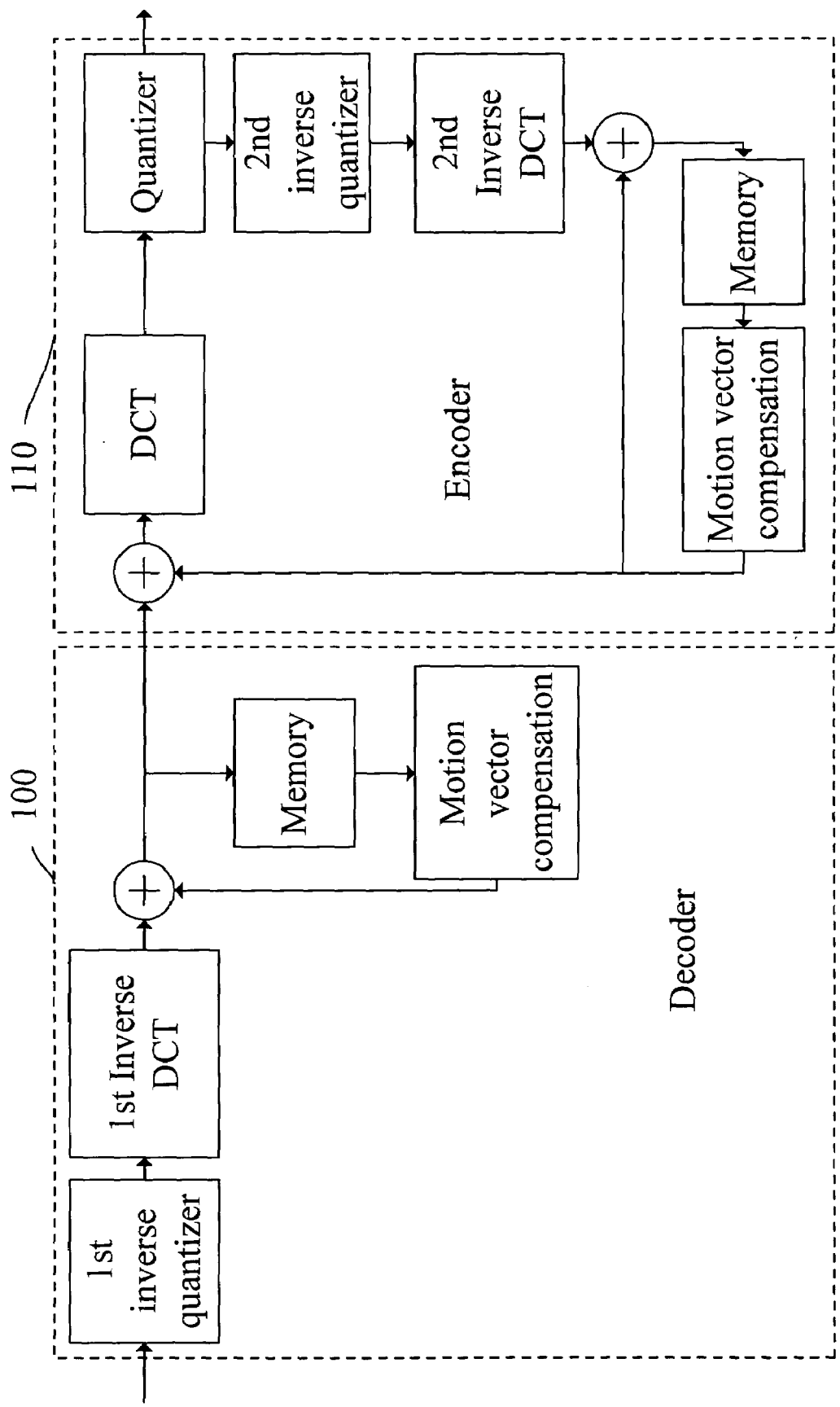
FIG. 1 is a block diagram of a typical video transcoder.
Figure 2:
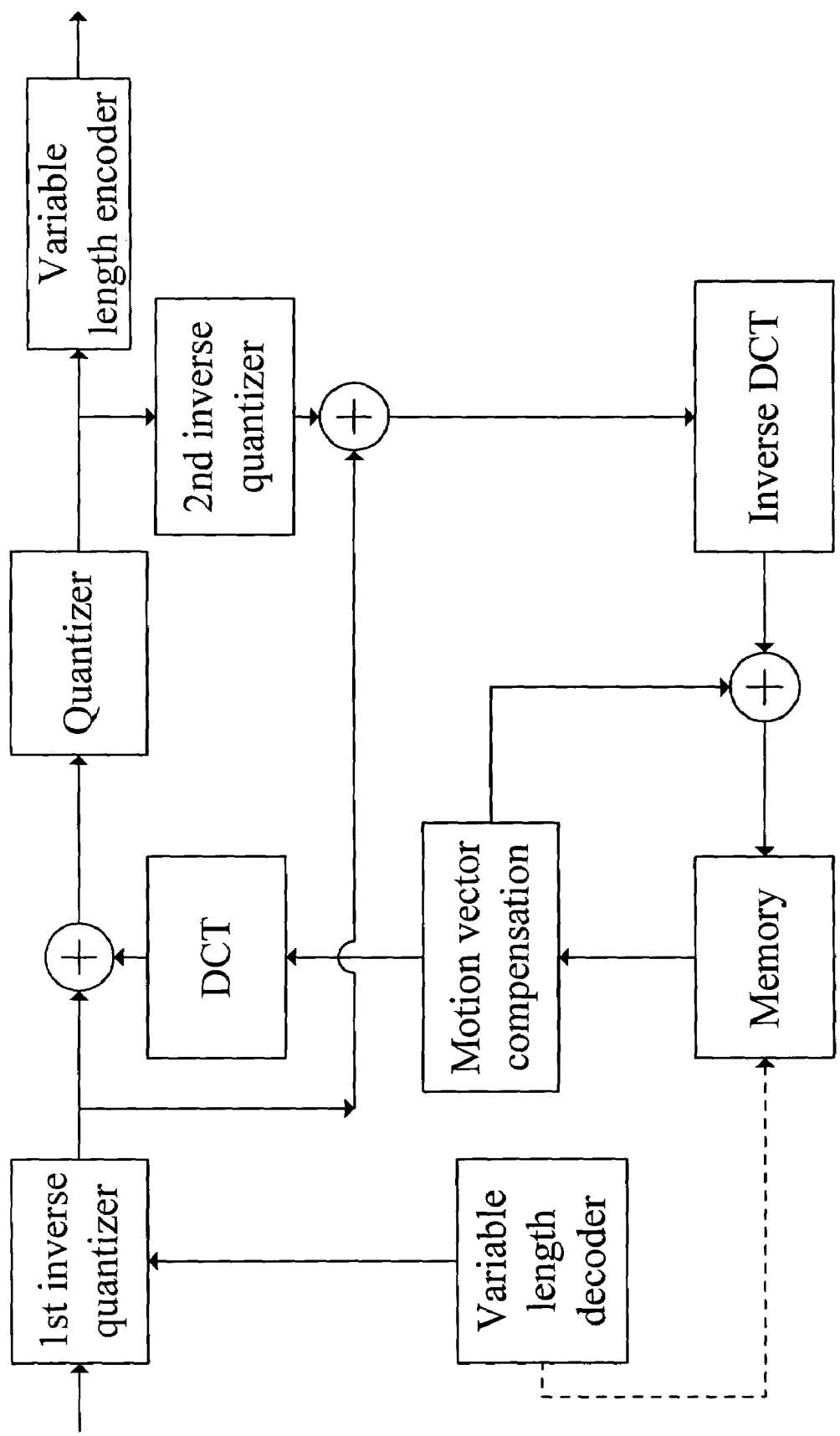
FIG. 2 is a block diagram of another typical video transcoder.
Figure 3:
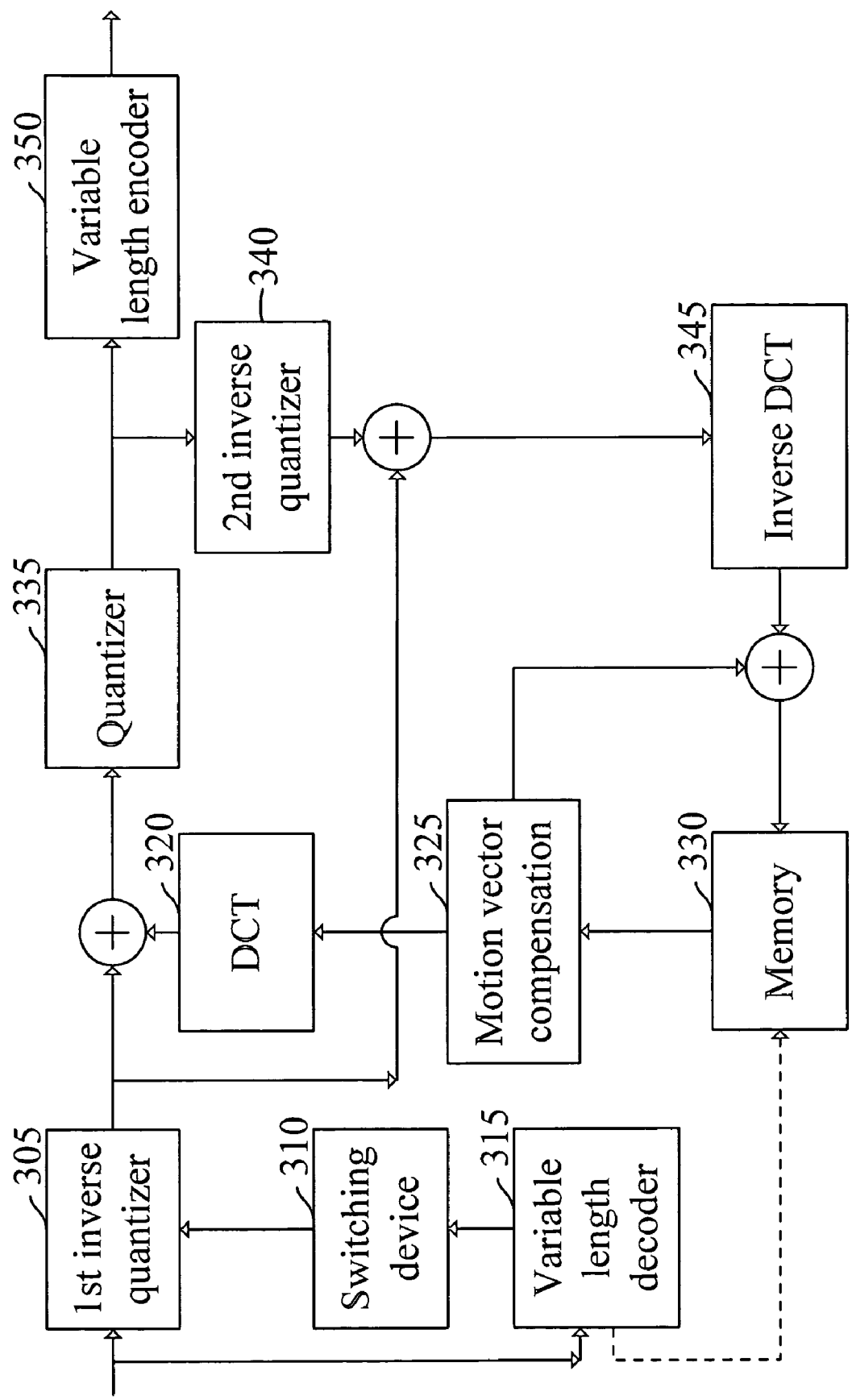
FIG. 3 is a block diagram of a transcoder system for adaptively reducing frame rate in accordance with the invention.

FIG. 3 shows a block diagram of an inventive transcoder system for adaptively reducing frame rate. As shown, the transcoder system includes a first inverse quantizer 305, a switching device 310, a variable length decoder 315, a discrete cosine transform (DCT) device 320, a motion vector compensation device 325, a memory 330, a quantizer 335, a second inverse quantizer 340, an inverse DCT device 345 and a variable length encoder 350. The transcoder system, compared to the prior sequential video transcoding structure (FIG. 1), is simpler because an inverse DCT is eliminated.

After receiving transmitted moving picture compression data, the inventive transcoder system performs bit-based decoding for converting a one-dimension data into a 2D data in a matrix. Next, the first inverse quantizer 305 performs inverse quantization and also the transmitted moving picture compression data is decoded by the variable length decoder 315 for motion vectors of macroblocks. The decoded motion vectors are stored in the memory 330 for computing motion vectors of macroblocks in coding.

Figure 4:
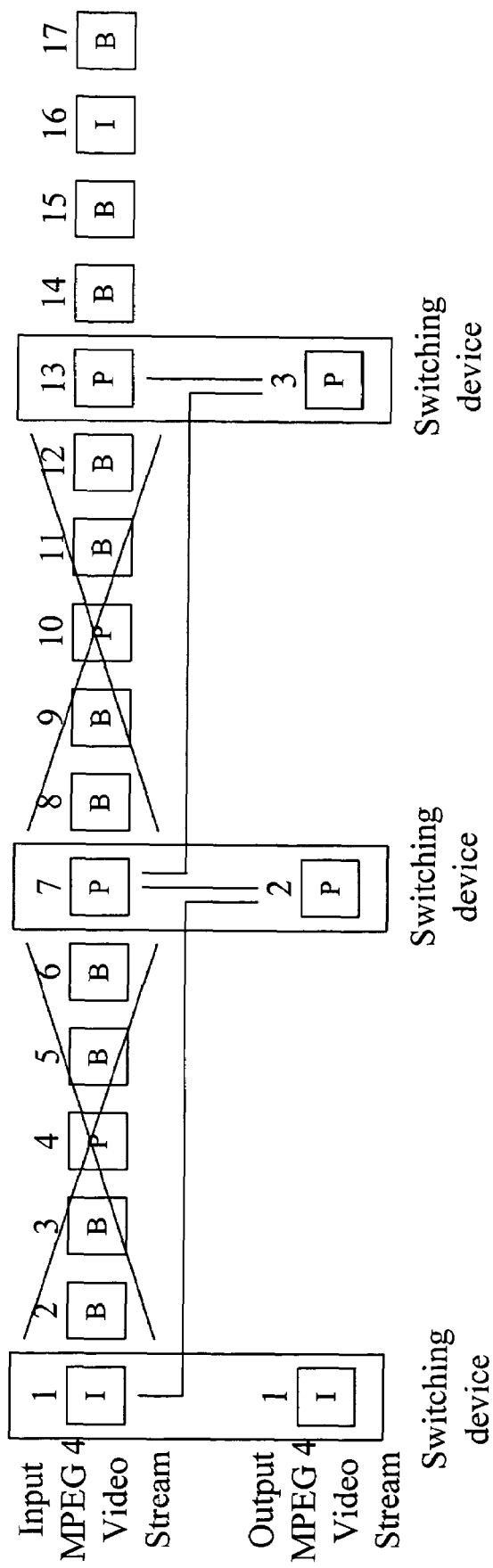
FIG. 4 is a schematic flow of operating a switching device of FIG. 3 in accordance with the invention.

The switching device 310 is a reduced frame-rate switch to switch on or off in accordance with network throughput (a predetermined algorithm). The device 310 can pick one every N pictures for passing, so as to reduce frame-rate. As shown in FIG. 4, when an input picture is to be skipped and not coded, the device 310 switches off to reject the picture to the first inverse quantizer 305. On the other hand, when an input picture is to be coded, the device 310 switches on to enter the picture into the quantizer 305 for coding.

MPEG coding predicts error of motion vector utilizing block-based motion compensation, prediction using the content difference between a forward or backward frame (picture) to the current frame. For I frames (Intra-coded pictures), the signals are processed directly by discrete cosine transform (DCT). For P or B frames, the signals are processed by the motion vector compensation device 325 for computing motion vectors and then motion compensations.

Next, the DCT device 320 performs a discrete cosine transform for converting spatial signals into frequency signals to thus eliminate spatial correlation. The quantization device 335 performs a quantization procedure on frequency signals in accordance with a quantization matrix corresponding to frame coding. In addition, unimportant information is eliminated to reduce digitized moving region. Since a 2D of data in a matrix is created after quantization, the 2D of data is changed into an array (1D) of data for performing a variable length coding by the variable length encoder 350 and then combining with the motion vectors to produce video compression code.

The motion vector compensation device 325 uses a bi-directional dominant vector selection to compute macroblock and block motion vectors for coding and outputting moving picture compression data.

The bi-directional dominant vector selection divides input frames into four types in accordance with a current and a preceding input frames to be coded. As shown in FIG. 5, when the preceding input frame to be coded is an I- or P-picture and the current input frame to be coded is a P-picture, the current input frame to be coded is of a first type. When the preceding input frame to be coded is an I- or P-picture and the current input frame to be coded is a B-picture, the current input frame to be coded is of a second type.

When the preceding input frame to be coded is a B-picture and the current input frame to be coded is a B-picture, the current input frame to be coded is of a third type. When the preceding input frame to be coded is a B-picture and the current input frame to be coded is a P-picture, the current input frame to be coded is of a fourth type.

Figure 6:
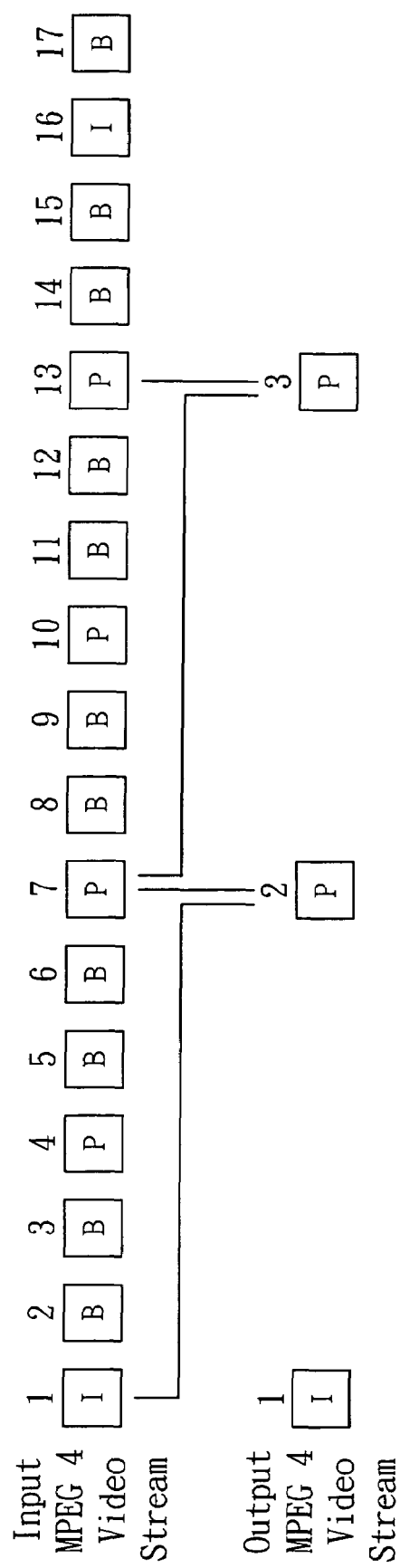
FIG. 6 is a schematic illustration of a first type of pictures in an MPEG 4 compression data in accordance with the invention.

FIG. 6 is a schematic illustration of the first type of frames in an MPEG 4 compression data. Namely, input moving picture compression data meets with the MPEG-4 Advance Simple Profile Standard, where M=3, intra period=15. As shown, for every 6 input frames, an input frame is retained as a coded output frame and the following 5 input frames are discarded. For example, a coded output frame(2-out), which is of the first type in accordance with FIG. 5, corresponds to a current P-picture input frame(7-in), which follows a preceding I-picture input frame(1-in) to be coded.

Figure 7:
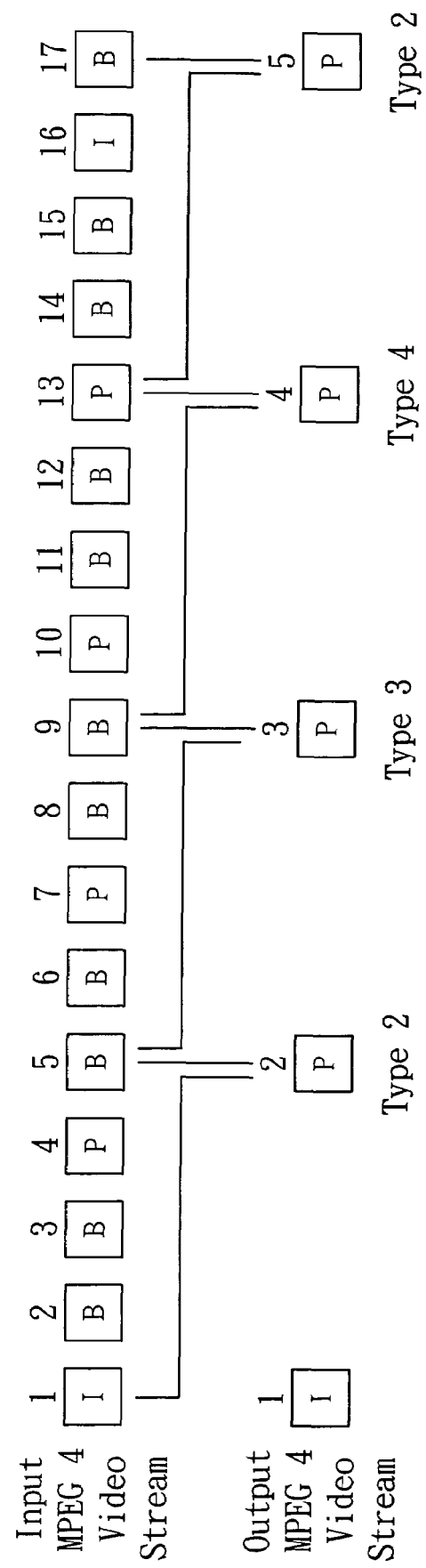
FIG. 7 is a schematic illustration of second, third and fourth types of pictures in an MPEG 4 compression data.

FIG. 7 is a schematic illustration of second, third and fourth types of frames in an MPEG 4 compression data. Namely, input moving picture compression data meets with the MPEG-4 Advance Simple Profile Standard, where M=3, intra period=15. As shown in FIG. 7, for every 4 frames, an input frame is retained as a coded output frame and the following 3 input frames are discarded. For example, a coded output frame(2-out), which is of the second type in accordance with FIG. 5, corresponds to a current B-picture input frame(5-in), which follows a preceding I-picture input frame(1-in) to be coded. Another coded output frame(3-out), which is of the third type, corresponds to a current B-picture input frame(9-in), which follows a preceding B-picture input frame(5-in) to be coded. Another coded output frame(4-out), which is of the fourth type, corresponds to a current P-picture input frame(13-in), which follows a preceding B-picture input frame(9-in) to be coded.

Figure 8:
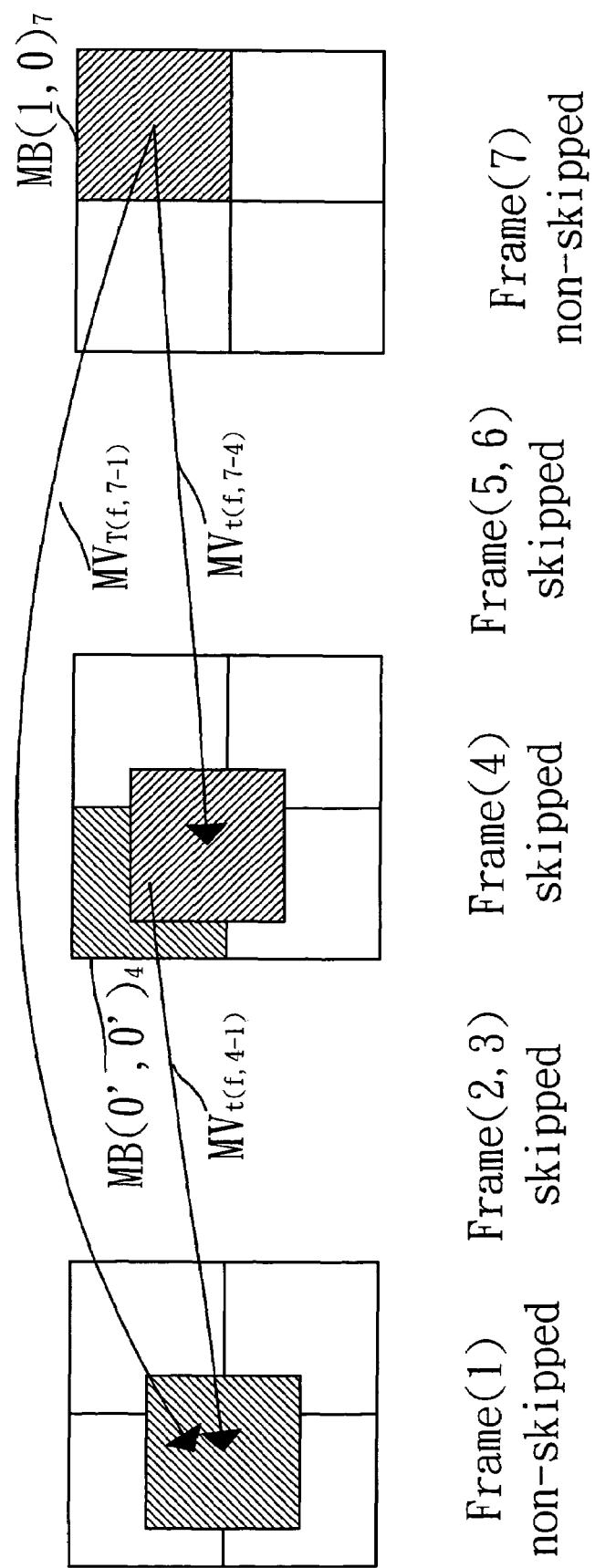
FIG. 8 a schematic illustration of selecting and computing motion vectors for macroblocks of a first type frames using a bi-directional dominant vector selection in accordance with the invention.

FIG. 8 a schematic illustration of selecting and computing motion vectors for macroblocks of a first type of frames in accordance with the invention, which is processed by the motion vector compensation device 325 using a bi-directional dominant vector selection. As shown in FIG. 6, only I- and P-pictures are used and all B-pictures are skipped. When the input frame(7-in) is transcoded into the output frame(2-out), in accordance with FIG. 7, macroblock motion vector indicated by $MB(1,0)_7$ in frame(2-out) is computed by finding motion vector $MV_{t(f, 7-4)}$ for $MB(1,0)_7$ firstly. The motion vector $MV_{t(f, 7-4)}$ is a motion vector for a reference block which points to input frame(4-in) as looking back with $MB(1,0)_7$. The reference block overlaps in four macroblocks in frame(4-in) and mostly on $MB(0', 0')_4$. As such, $MB(0', 0')_4$ is selected as a dominant macroblock. $MB(0', 0')_4$ is of P-picture and accordingly it also has a motion vector $MV_{t(f, 4-1)}$ pointing to frame(1-in)). Thus, the dominant vector $MV_{t(f, 7-4)}$ can be obtained by equation (1):

$$MV_{T(f, 7-1)} = MV_{t(f, 7-4)} + MV_{t(f, 4-1)}, \qquad (1)$$

where the dominant vector $MV_{T(f, 7-1)}$ is a motion vectors having the same position in output frame(2-out) and input frame(7-in) as $MB(1, 0)_7$.

Figure 9:
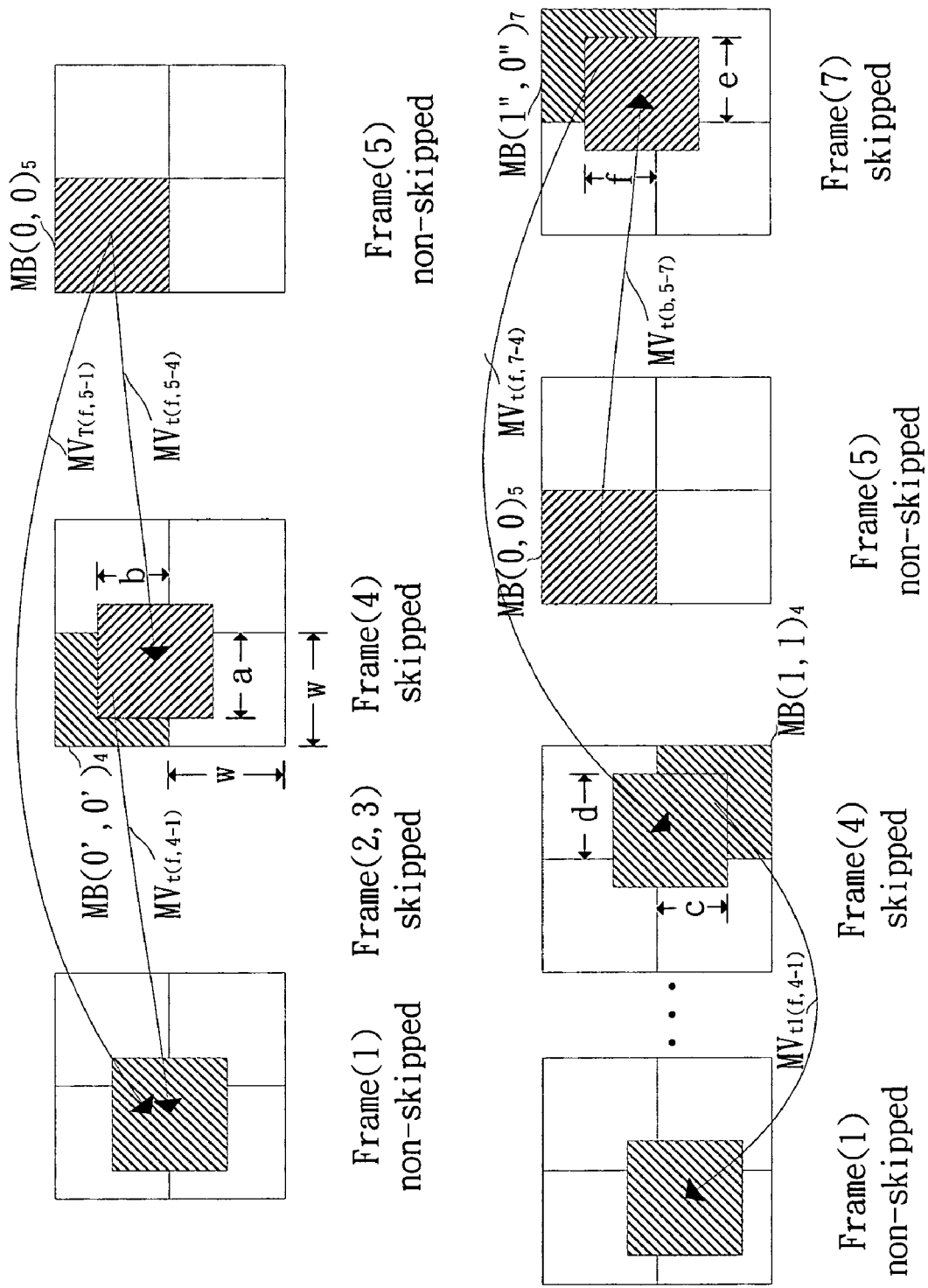
FIG. 9 is a schematic illustration of selecting and computing motion vectors for macroblocks of a second type frames using a bi-directional dominant vector selection in accordance with the invention.

FIG. 9 a schematic illustration of selecting and computing motion vectors for macroblocks of a second type of frames in accordance with the invention, which is processed by the motion vector compensation device 325 using a bi-directional dominant vector selection. As shown in FIG. 7, when the B-picture input frame(5-in) is transcoded into the output frame(2-out), in accordance with FIG. 9, macroblock $MB(1, 0)_5$ has two motion vectors, one as a forward motion vector $MV_{t(f,5-4)}$ and the other as a backward motion vector $MV_{t(b,5-7)}$, where appropriate one of the two motion vectors is selected to compute dominant vector. First, the vector $MV_{t(f,5-4)}$ points to a reference block in input frame frame(4-in). The reference block overlaps in four macroblocks in frame(4-in) and mostly on $MB(0', 0')_4$ in an overlapped proportion of $R_{(5-4)}$ with a area size represented by equation (2):

$$R_{(5-4)} = \frac{a \times b}{w \times w}。 \qquad (2)$$

Alternatively, the vector $MV_{t(b,5-7)}$ points to a reference block in input frame(7-in). The reference block overlaps in four macroblocks in frame(7-in) and mostly on $MB(1'', 0'')_7$ in an overlapped proportion of $$R_{(5-7)}\left(= \frac{e \times f}{w \times w}\right).$$

Since frame(7-in) is a P-picture, if $MB(1'', 0'')_7$ has a motion vector $MV_{t(7-4)}$, a reference block in frame(4-in) pointed by this vector has the most overlapped area on $MB(1',1')_4$ in an overlapped proportion of $$R_{(7-4)}\left(= \frac{c \times d}{w \times w}\right).$$

Therefore, the most overlapped area, which corresponds to a dominant macroblock as a dominant macroblock, is determined by equation (3):

$$\max(R_{(5-4)}, R_{(5-7)} \times R_{(7-4)}) \quad (3)$$

In accordance with equation (3), the dominant macroblock is $MB(0',0')_4$ when $R_{(5-4)}$ is greater than $R_{(5-7)}*R_{(7-4)}$. If $MB(0',0')_4$ has a motion vector $MV_{t(f,4-1)}$, a dominant vector $MV_{T(f,5-1)}$ is obtained by equation (4-1):

$$MV_{T(f,5-1)} = MV_{t(f,5-4)} + MV_{t(f,4-1)}, \quad (4\text{-}1)$$

where $MV_{T(f,5-1)}$ is a motion vectors having the same position in output frame frame(2-out) and input frame(5-in) as $MB(0, 0)_5$.

Conversely, the dominant macroblock is $MB(1'', 0'')_7$ when $R_{(5-7)}*R_{(7-4)}$ is greater than $R_{(5-4)}$. If $MB(1'', 0'')_7$ has motion vector $MV_{t(f,7-4)}$, the vector $MV_{t(f,7-4)}$ points to a reference block overlapped on $MB(1',1')_4$ in frame(4-in). If $MB(1',1')_4$ has motion vector $MV_{t1(f,4-1)}$, in this case the dominant vector $MV_{T(f,5-1)}$ is obtained by equation (4-2):

$$MV_{T(f,5-1)} = MV_{t(b,5-7)} + MV_{t(f,7-4)} + MV_{t1(f,4-1)}, \quad (4\text{-}2)$$

where $MV_{T(f,5-1)}$ is a motion vectors having the same position in output frame(2-out) and input frame(5-in) as $MB(0, 0)_5$.

Figure 10:
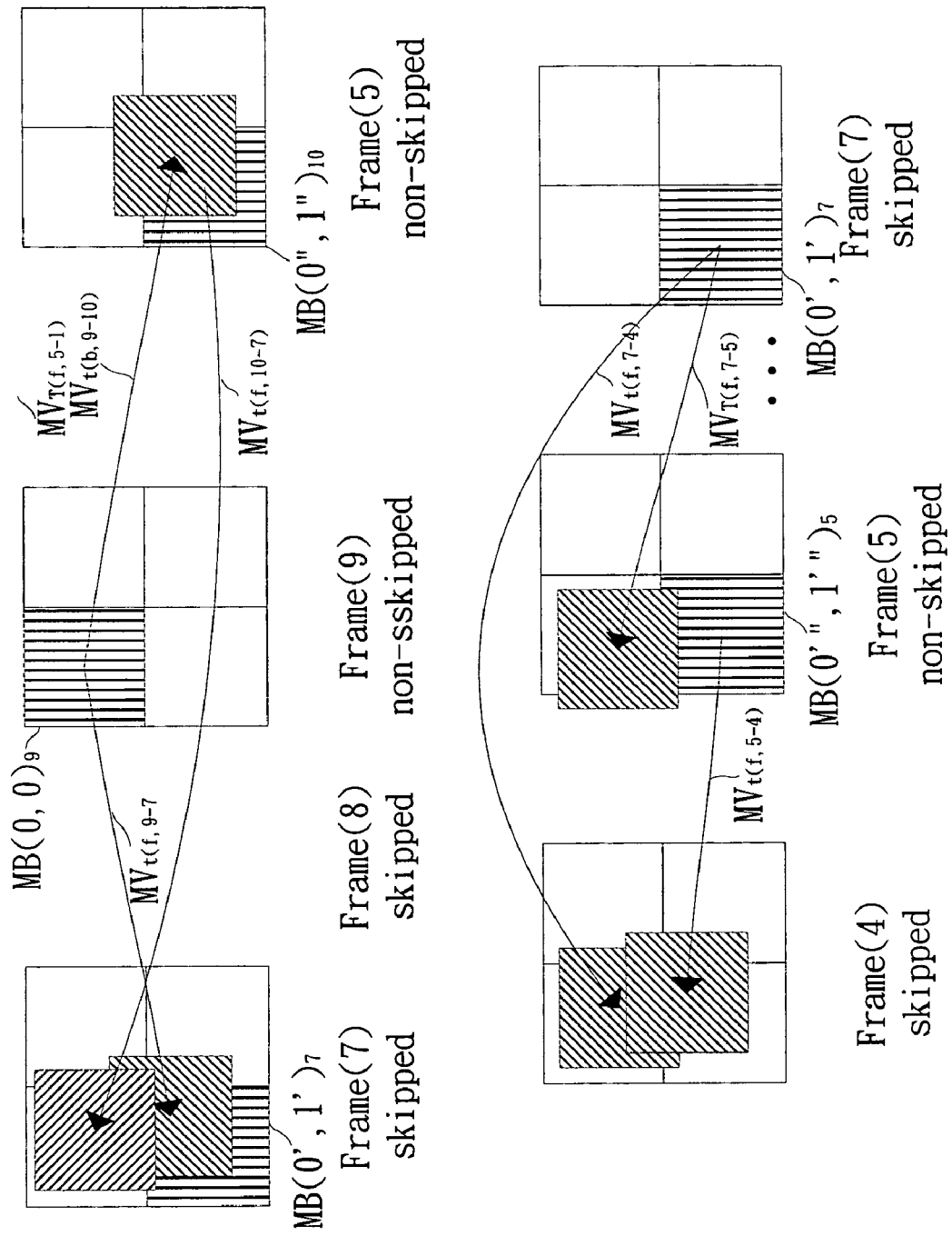
FIG. 10 is a schematic illustration of selecting and computing motion vectors for macroblocks of a third type frames using a bi-directional dominant vector selection in accordance with the invention.

FIG. 10 a schematic illustration of selecting and computing motion vectors for macroblocks of a third type of frames in accordance with the invention, which is processed by the motion vector compensation device 325 using a bi-directional dominant vector selection. As shown in FIG. 7, when the B-picture input frame(9-in) is transcoded into the output frame(3-out), in accordance with FIG. 10, macroblock $MB(0,0)_9$ has two motion vectors, one as a forward motion vector $MV_{t(f,9-7)}$ and the other as a backward vector $MV_{t(b,9-10)}$. In accordance with the aforementioned bi-directional dominant vector selection and computation of motion vectors for macroblocks of the second type of frames, an appropriate motion vector $MV_{t(f,9-7)}$ is selected to compute a dominant vector. Since motion vector of output frame(3-out) points to output frame(2-out) obtained by coding input frame(5-in), macroblock motion vector of frame(7-in) pointing to frame(4-in) is computed firstly. The same position in frame(5-in) as macroblock $MB(0',1')_7$ in frame(7) is located on macroblock $MB(0''',1''')_5$. $MB(0''', 1''')_5$ has a forward motion vector $MV_{t(f,5-4)}$ which points to frame(4-in). Motion vector $MV_{T(f,7-5)}$ for a reference block in frame(5-in) pointed by $MB(0',1')7$ is obtained by equation (5):

$$MV_{T(f,7-5)} = MV_{t(f,7-4)} - MV_{t(f,5-4)}. \quad (5)$$

Next, in accordance with vector $MV_{t(f,9-7)}$ obtained by applying the aforementioned bi-directional dominant vector selection to the second type of frames and vector $MV_{T(f,7-5)}$ obtained by equation (5), predictive motion vector $MV_{T(f,9-5)}$ for outputting is obtained by equation (6):

$$MV_{T(f,9-5)} = MV_{t(f,9-7)} + MV_{t(f,7-5)}. \quad (6)$$

Finally, the inventive motion vector compensation device 325 selects and computes macroblock motion vectors of a fourth type of frames using a bi-directional dominant vector selection. As shown in FIG. 6, when the input frame(13-in) is transcoded into the output frame(4-out), motion vector to be computed is pointed to the output frame(3-out). A P-picture frame(10-in) between frame(13-in) and frame(9-in) is skipped. Since frame(13-in) is a P-picture, macroblock motion vector $MV_{t(f,13-10)}$ of frame(13-in) pointing to frame (10-in) is obtained firstly. Next, motion vector $MV_{T(f,10-9)}$ for macroblock, pointing to frame(9-in), with the most area in frame(10-in) overlapped by a reference block pointed by $MV_{t(f,13-10)}$, is computed. Finally, predictive motion vector $MV_{T(f,13-9)}$ for outputting is obtained by equation (7):

$$MV_{T(f,13-9)} = MV_{t(f,13-10)} + MV_{t(f,10-9)}. \quad (7)$$

In view of foregoing, it is known that the invention can process video transcoding quickly for reduced frame-rate by a simple transcoder system with reduced frame-rate. Also, in accordance with I-, P- and B-pictures, the invention divides input frames into four types and computes macroblock and block motion vectors respectively for each type. Therefore, the aforementioned problem in the prior art is eliminated and video transcoding for image can be processed completely and quickly, thereby eliminating transcoding computation and further increasing transcoding speed.

Although the present invention has been explained in relation to its preferred embodiment, it is to be understood that many other possible modifications and variations can be made without departing from the spirit and scope of the invention as hereinafter claimed.

What is claimed is:

1. A transcoder system for adaptively reducing frame rate capable of changing audio-visual stream of a GOP (group of pictures), each picture consisting of a plurality of macroblocks, the transcoder system comprising:
   a switching device, which inputs the audio-visual stream and permits passing a part of pictures in accordance with a first algorithm;
   a variable length decoder connected to the switching device, which retrieves motion vector for each macroblock in the pictures;
   a motion vector compensation device, which computes output motion vectors respectively for the macroblocks in accordance with an input picture type;
   a memory connected to the motion vector compensation device, which stores the output motion vectors computed by the motion vector compensation device; and
   an encoder/decoder (codec) connected to the switching device, which decodes the pictures passing through the switching device using motion vector technique and then re-codes the pictures decoded in accordance with the output motion vectors computed by the motion vector compensation device.

2. The transcoder system as claimed in claim 1, wherein the codec comprises a first inverse quantizer and a second inverse quantizer, which have separate step sizes.

3. The transcoder system as claimed in claim 1, wherein the input picture type is a first type to indicate that a preceding I- or P-picture and a current P-picture pass through the switching device.

4. The transcoder system as claimed in claim 1, wherein the input picture type is a second type to indicate that a preceding I- or P-picture and a current B-picture pass through the switching device.

5. The transcoder system as claimed in claim 1, wherein the input picture type is a third type to indicate that a preceding B-picture and a current B-picture pass through the switching device.

6. The transcoder system as claimed in claim 1, wherein the input picture type is a fourth type to indicate that a preceding B-picture and a current P-picture pass through the switching device.

7. The transcoder system as claimed in claim 1, wherein the first algorithm performs that the switching device selects one every N pictures in the audio-visual stream for passing, so as to reduce frame rate, where N is a positive integer.

* * * * *